R. HERMAN & S. A. KNAPP.
PIPE BALL.
APPLICATION FILED JAN. 18, 1909.
1,173,963.
Patented Feb. 29, 1916.
3 SHEETS—SHEET 2.
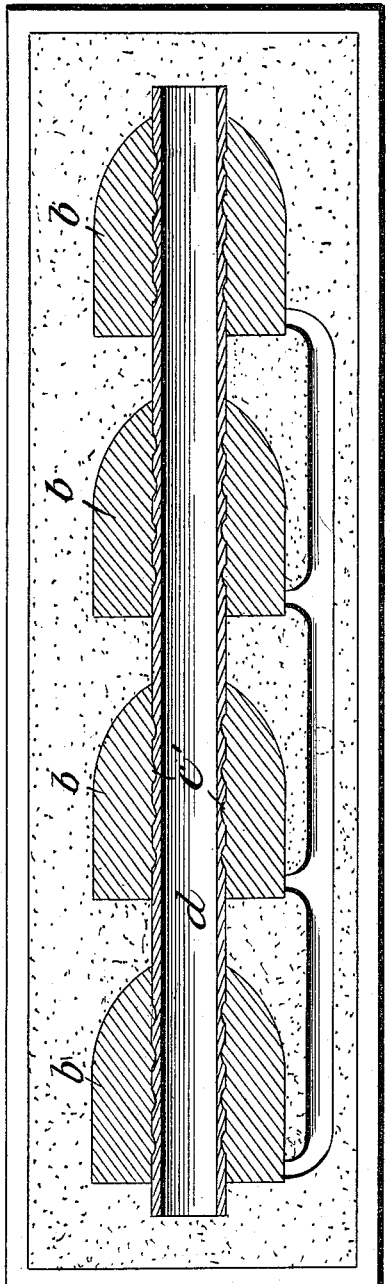
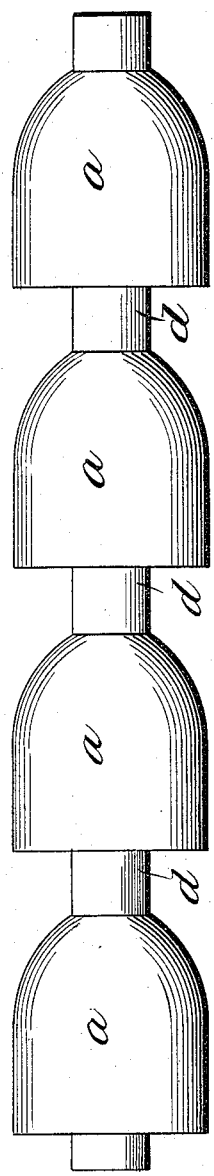
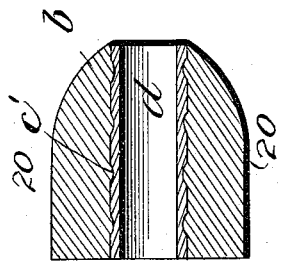

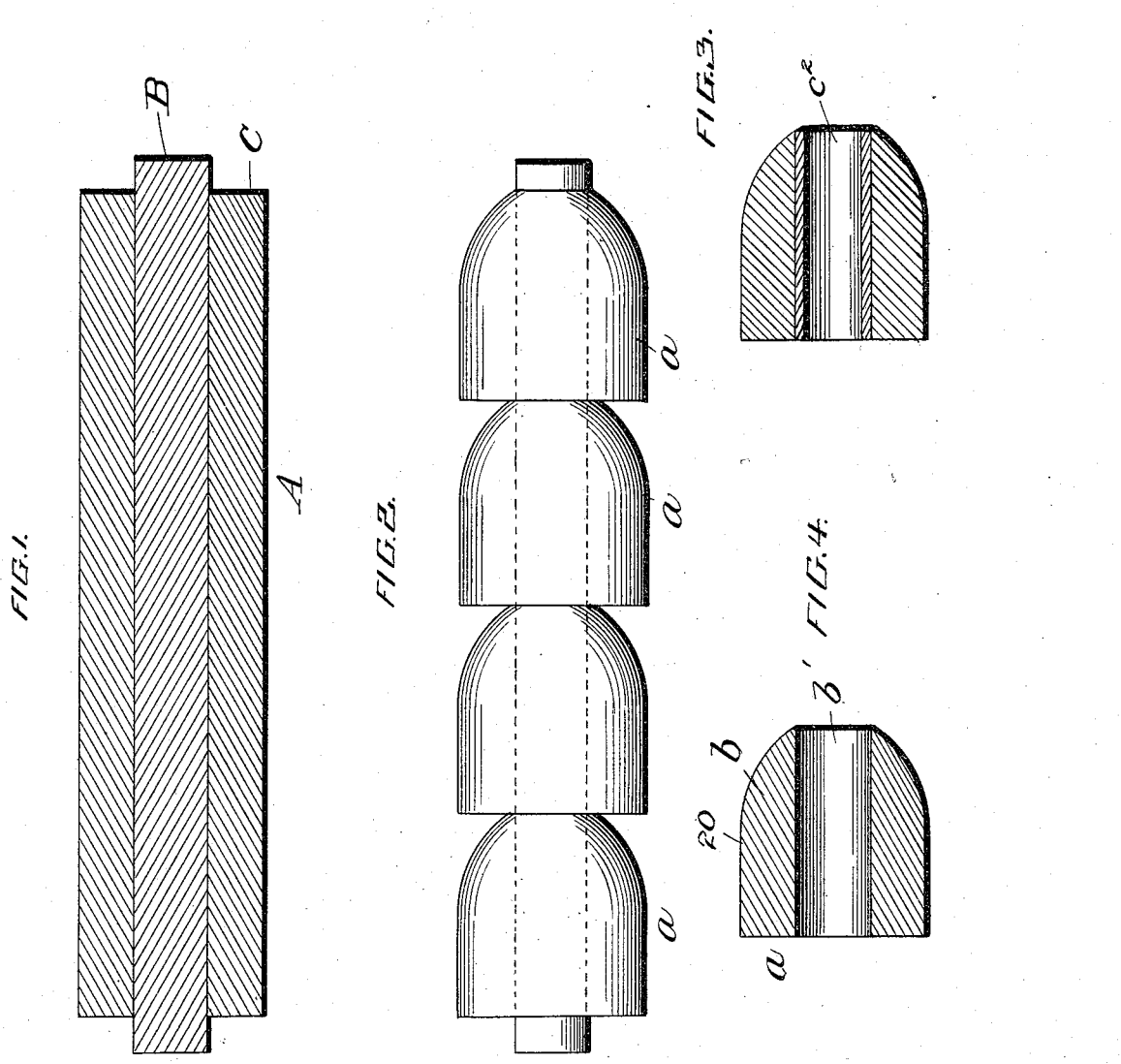

R. HERMAN & S. A. KNAPP.
PIPE BALL.
APPLICATION FILED JAN. 18, 1909.
1,173,963.
Patented Feb. 29, 1916.
3 SHEETS—SHEET 3.
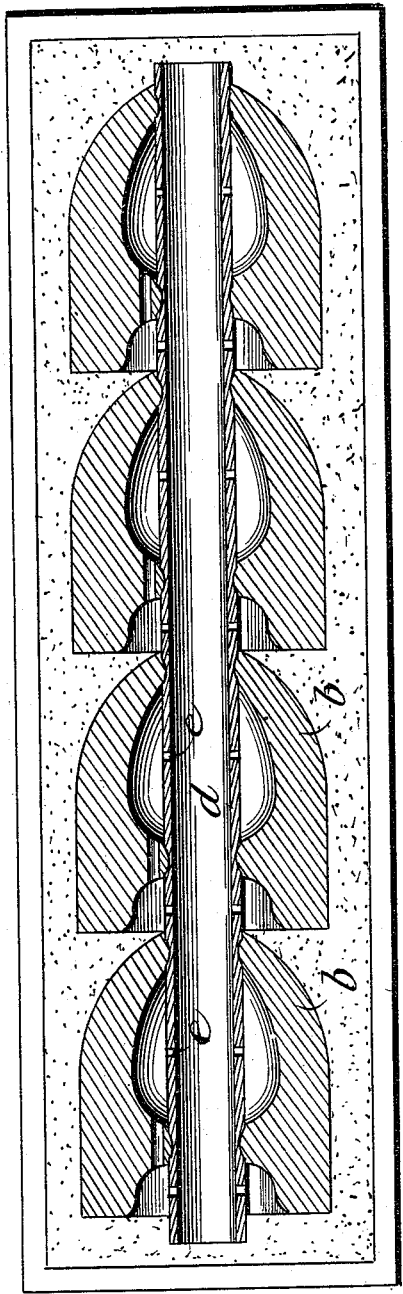
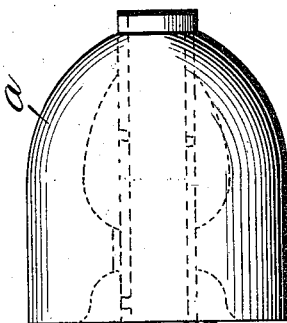
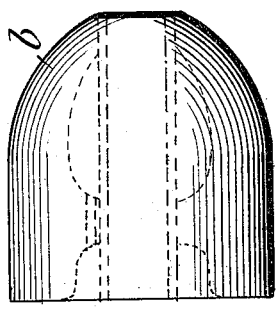
WITNESSES
INVENTORS
R. Herman
and S. A. Knapp.
BY
N. C. Everitt
Attorneys

UNITED STATES PATENT OFFICE.

REINHOLD HERMAN AND SANFORD A. KNAPP, OF CRAFTON, PENNSYLVANIA.

PIPE-BALL.

1,173,963.   Specification of Letters Patent.   Patented Feb. 29, 1916.

Application filed January 18, 1909. Serial No. 472,988.

*To all whom it may concern:*

Be it known that we, REINHOLD HERMAN and SANFORD A. KNAPP, citizens of the United States of America, residing at Crafton, in the county of Allegheny and State of Pennsylvania, have invented certain new and useful Improvements in Pipe-Balls, of which the following is a specification, reference being had therein to the accompanying drawing.

Our invention relates to improvements in pipe balls for use in connection with the welding of pipes.

Pipe balls as heretofore and as at present generally used, have been made from cast iron, generally of what is known in the trade as "gray iron." The life of such a ball is extremely short, due to a number of causes, for instance, the ball may be made too hard, or too soft, in the casting operation; again, the high degree of heat to which such balls are subjected causes the face of the ball to scale, and as this scale must be removed before the ball can be again used, the original diameter of the ball is destroyed, thus rendering the ball useless for further welding of pipe of the diameter for which the ball was first used. Again, this scaling of the ball oftentimes results in the face of the ball becoming pitted, rendering it worthless for further use than as scrap for re-melting. As a rule therefore, the life of a cast iron pipe ball does not exceed six "passes" and even this number may not be made without allowing the ball sufficient time to cool between "passes" that the same may not become soft due to the high heating, and "crushed" under pressure to which it is subjected.

The main object of our invention is to provide a pipe ball in which the "pressure face" will remain serviceable for use a multiple number of times that of the similar face of the balls now in general use.

A further object is to provide a ball which requires a minimum amount of treatment after being used in the welding operation.

A further object is to provide a ball having its outer and inner faces formed of different metals permanently connected together.

A further object is to provide a ball having an annular space intermediate its exposed faces, said spaces being open toward the butt end of the ball.

A further object is to provide a self-tempering ball.

A further object is to provide a ball having a surface capable of being lubricated.

To these and other ends, the nature of which will be readily understood as the invention is hereinafter disclosed, our invention consists in the improved construction and combination of parts, hereinafter fully described, illustrated in the accompanying drawings, and particularly pointed out in the appended claims.

In the drawings, in which similar reference characters indicate similar parts in each of the views, Figure 1 is a longitudinal sectional view of an ingot, cast or molded with a soft iron core or center and a self-hardening steel body portion, Fig. 2 is a view in elevation showing the ingot removed from its mold and turned up so as to form a plurality of pipe balls to be separated, Fig. 3 is a longitudinal sectional view of one of the balls shown in Fig. 2 in its finished form, viz., with the inner lining formed by boring out the center of the core shown in Fig. 1, Fig. 4 is a similar view showing the core entirely removed, Fig. 5 is a longitudinal sectional view taken through a mold and showing a metallic core, a plurality of balls cast thereon, and the pouring ducts or gates for casting the balls from a single gate, the balls being separated from each other, Fig. 6 is a view in elevation of the balls shown in Fig. 5, the balls being connected by the core, Fig. 7 is a view in longitudinal section of one of the balls shown in Figs. 5 and 6, the ball being in its completed form, Fig. 8 is a longitudinal sectional view through a mold and showing a plurality of balls cast around a metallic core, and having a series of sand cores arranged around the metallic core, Fig. 9 is a view in elevation of a series of connected balls formed in the manner shown in Fig. 8, Fig. 10 is a view in elevation of one of the finished balls shown in Fig. 9, and Fig. 11 is an end view of the same.

As heretofore pointed out, the main object of the present invention is to provide a pipe ball by means of which the pressure face or portion will be of relatively long life. To produce this, we form the main portion of the balls of steel, preferably using a particular form of this metal, and which we will term a "self-hardening"

steel. The ordinary steel metal does not, in itself, provide the complete desired result, for the reason that the effect of loss of temper is similar to that of the cast iron ball, but to less extent.

The self-hardening steel referred to is not readily turned, although it is possible to obtain the result by turning; better results may be obtained by grinding. Furthermore, the steel does not require tempering after being cast. We have found, however, that while the ball may be made solely from the steel itself, better results are obtainable when the ball is formed with what we term a hollow metallic "core" preferably permanently secured therein, and forming a lining for the ball, said core being formed of a different metal, such for instance as soft iron or ordinary Bessemer steel. This permanently produces a coating or lining to the interior of the ball and which is formed of a metal which rapidly cools and thereby provides a permanent chilling member within the ball, which, in addition to the exposed outer surfaces of the ball provides for a reasonable rapidity of cooling effect on the ball.

In use, the pressure face of the ball is comparatively free from scales, and if formed at all, are of such slight character as to be readily removed without affecting the surface to any appreciable extent. And the chilling of the ball both interiorly and exteriorly has the effect of restoring the normal temper of the ball, so that its temper is not materially affected by the continued use.

Referring to the drawings, we will first describe the ball and then one form of making it, the different forms being taken up successively.

In Fig. 3, the ball $a$ is shown as formed of a steel body portion $b$ having its exterior of the usual form of pipe balls, the "pressure face" being indicated at 20, it being that portion which is of greatest diameter. The ball in this form is made by providing an ingot A as shown in Fig. 1, having a soft iron core B and a self-hardening steel body portion C. The ingot is then turned or ground to provide the ball shapes $a$ shown in Fig. 2, and then the several balls are separated and the soft iron core drilled or bored out so as to provide the central opening $b'$ (Fig. 4) for the mandrel. Or the ingot may be cut into proper lengths and then each length turned up and bored out as above described. In the form shown in Fig. 3, the entire core is not removed, the opening being of less diameter than the core, and being arranged centrally of the core, there is provided a metallic lining $c^2$ permanently secured to the body portion. In the form shown in Fig. 4, the entire core is bored out, the ball, in this case having no permanently secured lining. The ball, in this form as in the other forms presently described, may be made singly, but for the purpose of cheapness in manufacture, we prefer to form in this instance, an ingot from which a plurality of balls may be made, and the description of the casting operations will be based on such preferred form of operation, it being understood, however, that the same process will serve to form the balls singly.

To form the ball as shown in Figs. 5 to 7, the mold may be of any desired character, and after being formed by the pattern, a hollow core $d$ (preferably of metal) is placed therein, the core $d$ extending beyond the ends of the mold cavities, as shown in Fig. 5, to provide a proper support for the core. The metal for the body portion is then poured into the mold, and a plurality of balls formed, all of which are connected together on the core $d$. When the metal has cooled sufficiently to permit its removal from the mold, the structure is removed therefrom, whereupon the chilling action of the air on the outer surface of the ball and that passing through the core is produced, causing the metal of the body portion to assume its proper temper.

In the construction of ball shown in Figs. 5 to 7, the core is preferably provided with annular recesses $c'$ within which the metal of the body-portion passes during the casting operation. The interior opening of the lining is shown of equal diameter from end to end.

The ball shown in Figs. 8 to 11 differs from that shown in Fig. 7 in that the body portion is not in metallic contact with the core throughout the length of the opening, annular spaces $d'$ being formed around the core, said spaces being connected together by connecting openings $e'$, the core, however, being secured to the body portion at the point of the ball and adjacent its butt end. The spaces $d'$ serve to permit of the entrance of air between the core and the body portion to form a direct air chill instead of the indirect air chill produced by the metallic core. These spaces open toward the butt end of the ball and therefore do not produce a circulation of air within the pipe prior to being brought into the welding mechanism, any exit of air therefrom, due to the increase of heat, causing the air to pass into contact with the welded portion of the pipe. The core in this construction is provided with vent openings $e$ to allow the escape of hot gases during casting which may be conducted from the ends of the core out through the mold in any desired manner.

As above indicated either method of manufacture may be used to form the ball shown in connection with any of the remaining methods of manufacture, the drawings being intended to illustrate different forms of balls and also different methods of manufacture, none of the methods, however, being necessarily specific to any specific form of ball.

The use of the ball is believed to be clear from the description of operation as heretofore pointed out. In addition thereto, however, it is to be noted that, if desired, the ball, after its discharge from the welding mechanism, may be subjected to the action of a lubricant or a lubricating bath, the particular material of which the ball is made permitting an efficient use of a lubricant on the frictional surface.

Having thus described our invention and pointed out several forms in which it may be provided and several different methods which may be employed to produce the result, but without pointing out all of the various changes or modifications which may be made therein within the scope of the appended claims, what we claim as new is:

1. A pipe ball for pipe welding operations comprising a body portion having an operating face formed of a metallic material adapted to provide an excess of fifteen passes of pipe, the operating face remaining substantially constant on a cross section of the ball throughout the passes, whereby the internal diameter of each pipe will be substantially uniform from end to end and the similar diameters of all of the pipes will be substantially constant, said body and its face being integral, the material of said face and body being steel.

2. A pipe ball for pipe welding operations comprising a body portion having an operating face formed of a metallic material adapted to provide an excess of fifteen passes of pipe, the operating face remaining substantially constant on a cross section of the ball throughout the passes, whereby the internal diameter of each pipe will be substantially uniform from end to end and the similar diameters of all of the pipes will be substantially constant, said body and its face being integral, the material of said face and body being self-hardening steel.

In testimony whereof we affix our signatures in the presence of two witnesses.

REINHOLD HERMAN.
SANFORD A. KNAPP.

Witnesses:
CARL R. HERMAN,
ERNEST PAYNE.

Copies of this patent may be obtained for five cents each, by addressing the "Commissioner of Patents, Washington, D. C."